No. 783,171. PATENTED FEB. 21, 1905.
G. W. BEEBE.
CHECK PROTECTOR.
APPLICATION FILED DEC. 17, 1901.

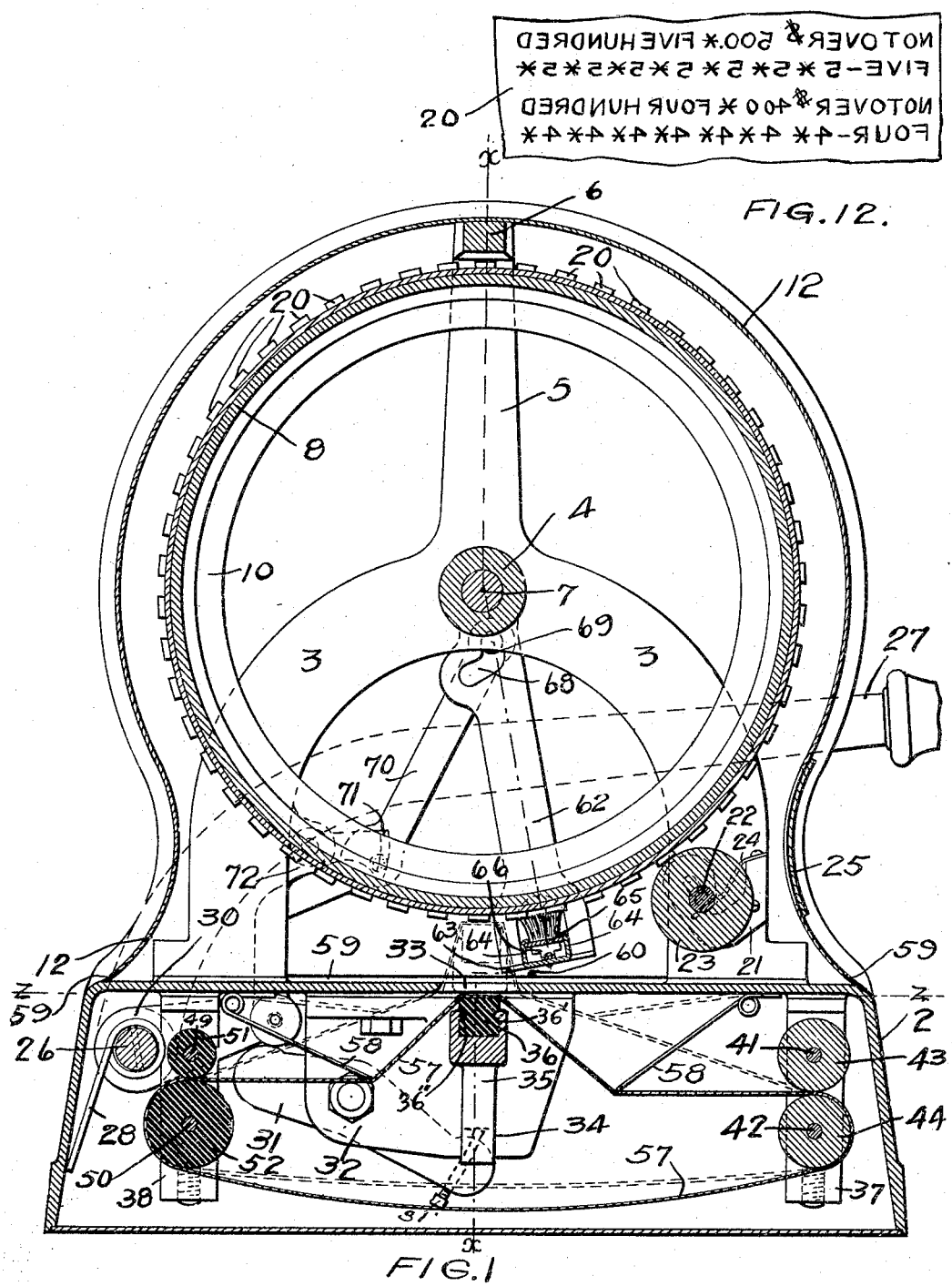

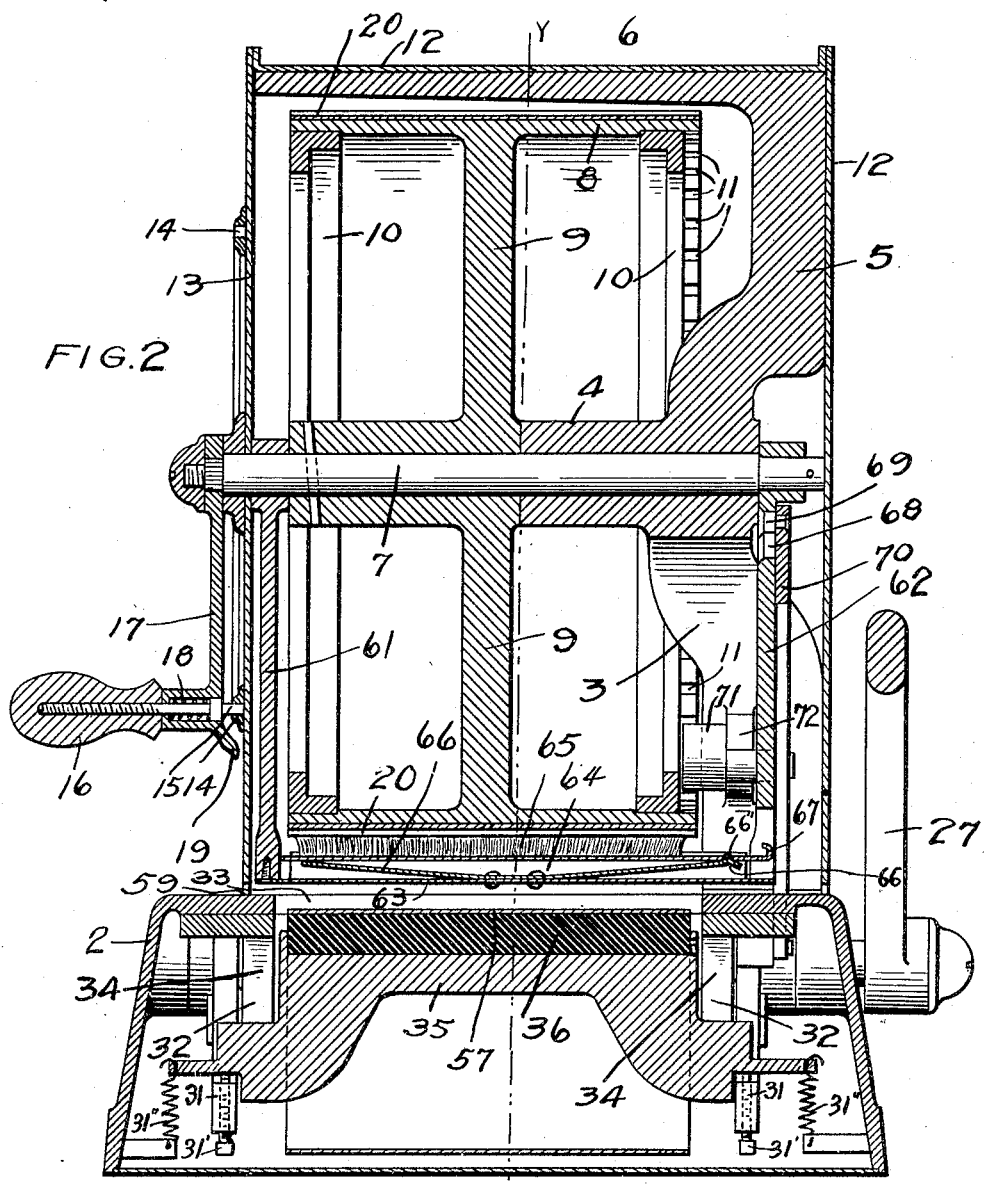

5 SHEETS—SHEET 3.

WITNESSES.

INVENTOR
GAYLORD W. BEEBE
BY Paul & Paul
ATTORNEYS.

No. 783,171. PATENTED FEB. 21, 1905.
G. W. BEEBE.
CHECK PROTECTOR.
APPLICATION FILED DEC. 17, 1901.

5 SHEETS—SHEET 4.

WITNESSES.
E. G. Staude
M. C. Noonan

INVENTOR
GAYLORD W. BEEBE
BY Paul & Paul
ATTORNEYS.

No. 783,171. PATENTED FEB. 21, 1905.
G. W. BEEBE.
CHECK PROTECTOR.
APPLICATION FILED DEC. 17, 1901.

5 SHEETS—SHEET 5.

WITNESSES.
E. G. Staude
M. C. Noonan

INVENTOR
GAYLORD W. BEEBE
BY Paul & Paul,
ATTORNEYS.

No. 783,171.  
Patented February 21, 1905.

UNITED STATES PATENT OFFICE.

GAYLORD W. BEEBE, OF MINNEAPOLIS, MINNESOTA, ASSIGNOR TO G. W. TODD & COMPANY, OF ROCHESTER, NEW YORK, A FIRM.

CHECK-PROTECTOR.

SPECIFICATION forming part of Letters Patent No. 783,171, dated February 21, 1905.

Application filed December 17, 1901. Serial No. 86,254.

*To all whom it may concern:*

Be it known that I, GAYLORD W. BEEBE, of Minneapolis, Hennepin county, Minnesota, have invented certain new and useful Improvements in Check-Protectors, of which the following is a specification.

My invention relates to means for marking checks, drafts, bonds, or other instruments with figures or characters in such a manner to prevent them from being altered or "raised," the figures or characters marked on the paper representing a sum greater than its face value, and said figures or characters being preceded by the words "Not over."

A further object is to provide a check-protector that can be easily and quickly operated, requiring but one movement of a lever for inking the dies and bringing the paper to be marked into engagement therewith, and hence having great efficiency and large capacity and particularly adapted for large business houses and financial institutions, where speed in the operation of a machine of this kind is essential.

Other objects of the invention will appear from the following detailed description.

The invention consists generally in providing a wheel or drum rotating in a vertical plane and carrying a series of fixed dies.

Further, the invention consists in means for moving the paper to be marked into contact with said dies.

Further, the invention consists in means actuated by the force that moves the paper toward said dies for inking them before the engagement of the paper therewith.

Further, the invention consists in means for inking the under side of the mark or character made in or on the paper.

Further, the invention consists in improved means for locking the die-holder or drum during the operation of marking the paper.

Further, the invention consists in various constructions and combinations, all as hereinafter described, and particularly pointed out in the claims.

Figure 4:
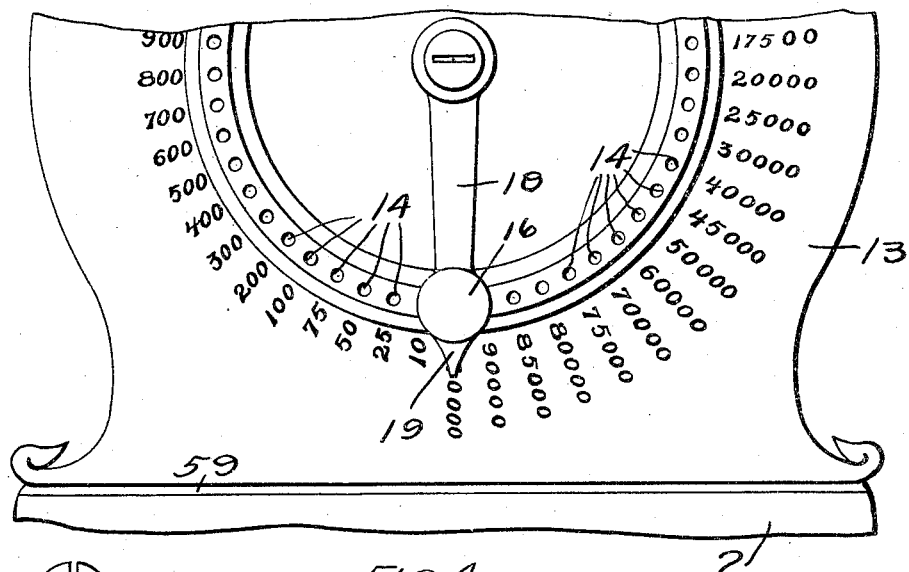
Figure 3:
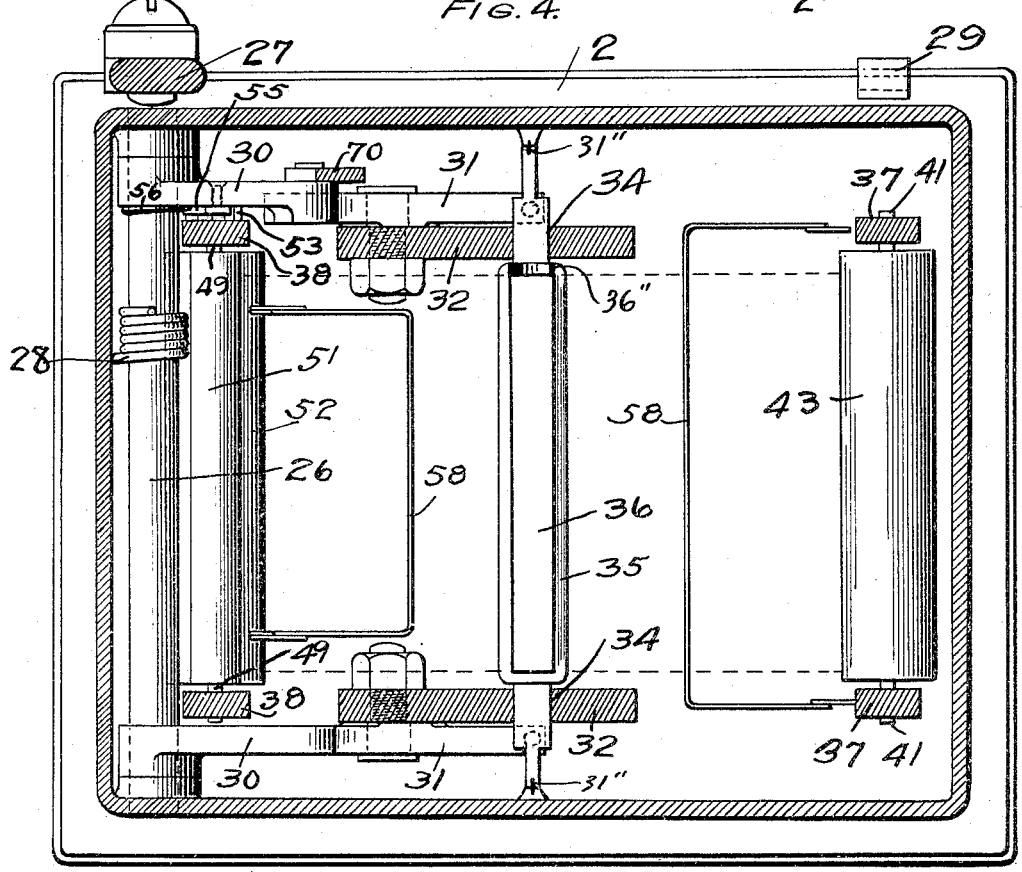
Figure 5:
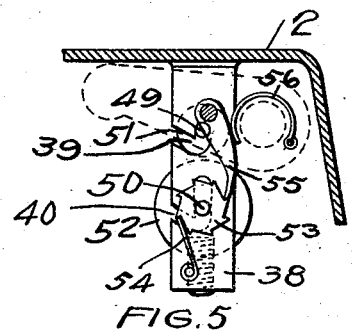
Figure 6:
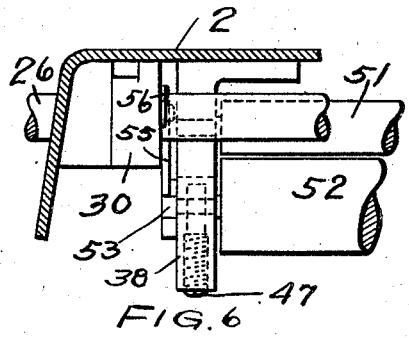
Figure 7:
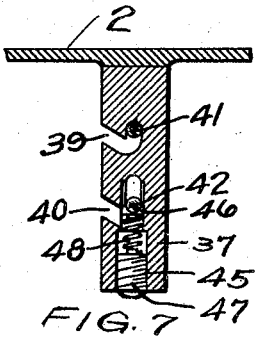
Figures 16, 17:
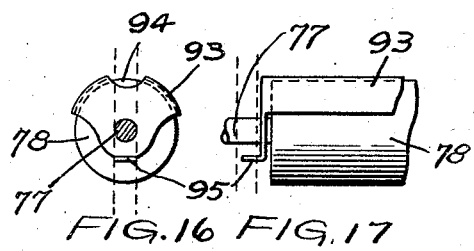
Figures 8, 9:
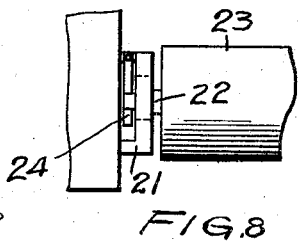
Figures 10, 11, 15:
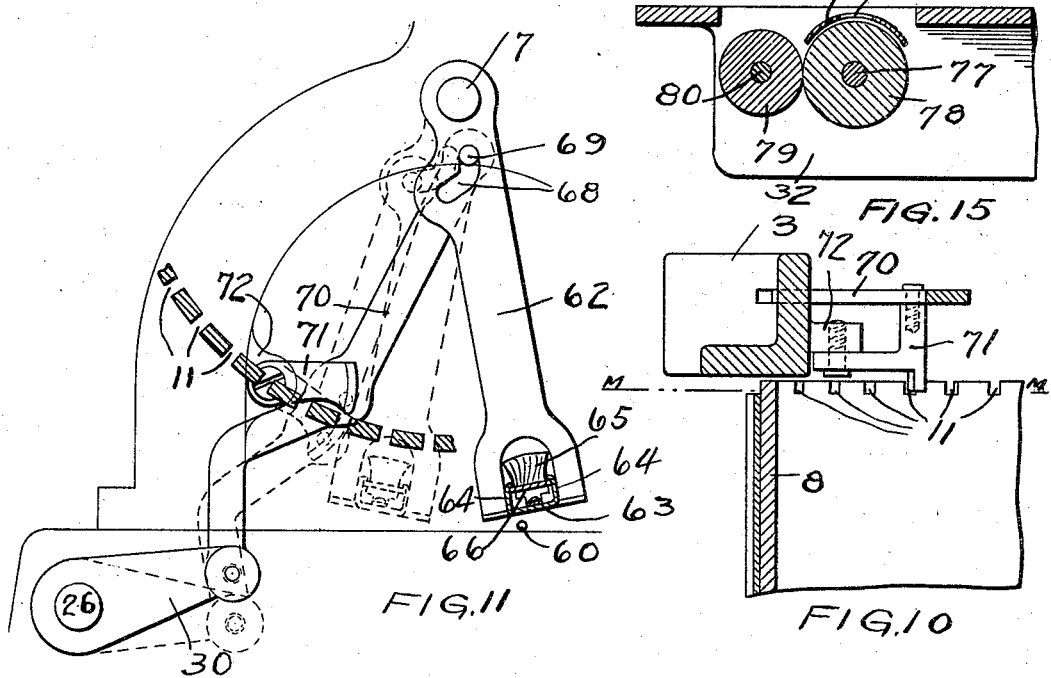
Figure 13:
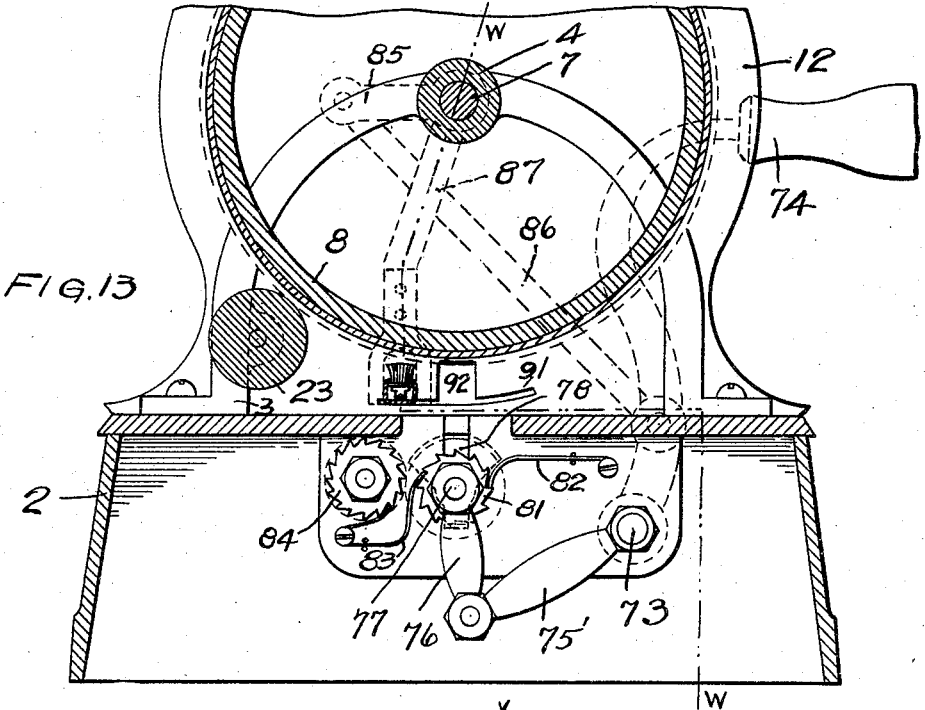
Figure 14:
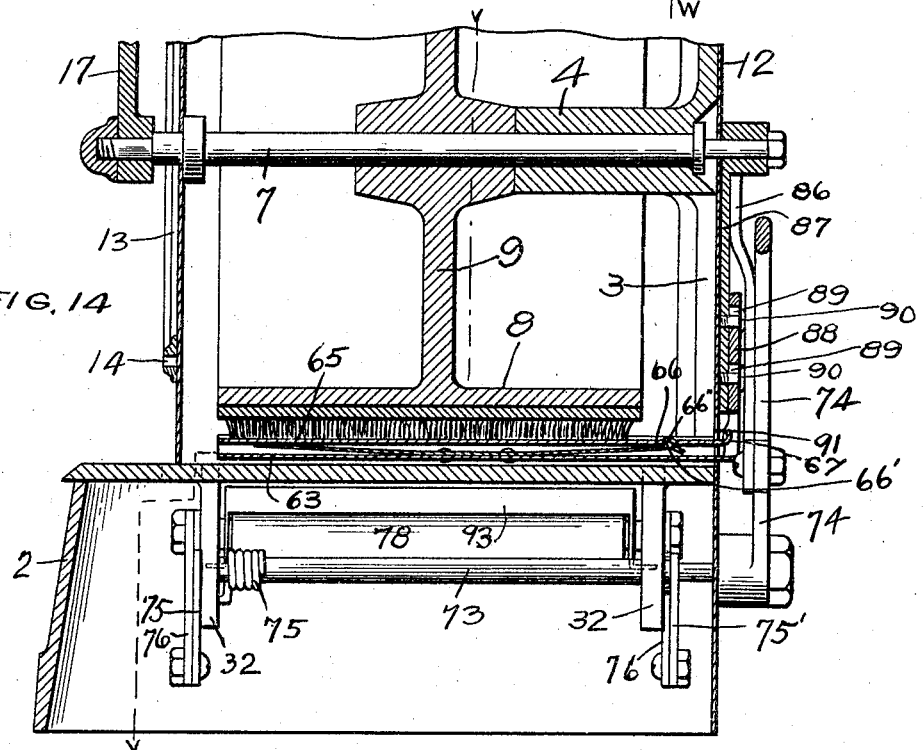

In the accompanying drawings, forming part of this specification, Figure 1 is a vertical section of a check-protector embodying my invention, taken on the line $y\ y$ of Fig. 2. Fig. 2 is a similar section on the line $x\ x$ of Fig. 1. Fig. 3 is a horizontal section on the line $z\ z$ of Fig. 1. Fig. 4 is a front elevation of a portion of a machine, showing the dial thereon. Figs. 5, 6, and 7 are details of the ribbon-rollers provided in the base of the machine. Figs. 8 and 9 are details of the manner of supporting the stationary inking-roller. Fig. 10 is a detail of the die-holder-locking device. Fig. 11 is a section on the line $m\ m$ of Fig. 10. Fig. 12 is a view of the face of two of the dies. Fig. 13 is a section on the line $v\ v$ of Fig. 14. Fig. 14 is a section on the line $w\ w$ of Fig. 13, both showing a modified construction. Fig. 15 is a detail of the rollers provided in Figs. 13 and 14. Figs. 16 and 17 are details of the guard provided over one of the rollers in the modified construction. Fig. 18 shows a die with a serrated face. Fig. 19 is a section on line $w\ w$ of Fig. 18.

In the drawings, 2 represents the base of the machine of any suitable material, preferably cast metal, and whereon the operating mechanism is arranged. Near the back of the base I provide an upright standard constituting the frame of the machine and comprising legs 3, that are suitably secured to the base, a hub 4, and a vertical extension 5, provided with a horizontal arm 6, that overhangs the die-holder.

7 is a shaft mounted in a hub 4 and carrying a die-holder 8 in the form of a wheel or drum. This drum is preferably cast, having spokes 9 and strengthened and braced by rings 10, that are fitted in place after the casting is made. The die-holder is secured on the shaft by any suitable means, and its rear edge is provided with a series of notches 11 for the purpose hereinafter described.

A sheet-metal casing 12 incloses the working parts of the machine and rests upon the base and is provided at the front of the machine with a dial 13, on which I provide a series of figures, as shown in Fig. 4, representing sums from ten dollars up to one hundred thousand dollars, the sums being preferably multiples of five, though any other arrangement of the figures may be employed, if preferred, as the sums on the dial may be increased or diminished according to the needs of the institution using the machine. The dial is provided with a series of holes 14, adapted to receive a pin 15, whose threaded end is provided with a handle 16, carried upon an operating-arm 17, secured on the shaft 7 and provided with a spring 18, that holds said pin in engagement with a hole on the dial with a yielding pressure. The handle is also provided with a pointer 19, and by drawing out the handle 16 the operator may rotate the die-holder and set the pointer opposite any desired sum on the dial. Upon the periphery of the die-holder are a series of fixed dies 20, each bearing the words "Not over" and figures or characters corresponding to certain figures or characters on the dial. The face of each die is preferably serrated to bruise the paper and cause a more complete absorption of the ink. The dies are oppositely arranged from the figures representing them on the dial, so that as the indicator is moved over the dial and set opposite certain figures thereon the die corresponding to such figures will be in proper position to mark the paper. As shown in Fig. 12, I may repeat some of the letters and figures representing a certain sum on each die to render it more difficult to alter or raise the check or draft.

Upon one of the legs 3 and on the inside of the dial I arrange hook-shaped clips 21, whose looped ends are adapted to receive the ends of a shaft 22, whereon a normally stationary inking-roller 23 is arranged. Springs 24 close the open ends of the loops in said hooks and prevent the accidental disengagement of the shaft 22 therefrom, but permit the removal of the shaft and roller at any time and hold the roll in contact with the dies with a yielding pressure. This roller has its surface in position to be engaged by the dies as the die-holder is revolved. A plate 25 covers an opening in the sheet-metal casing and permits access to the inking-roll. At one side of the base 2 I provide a horizontal rock-shaft 26, provided on the outside of the base with an operating-lever 27, that is normally held in its raised position by a spring 28, arranged on said shaft. Downward movement of said lever is limited by a stop device 29, provided on said base. Arms 30 are secured on said shaft near the walls of the base and are adapted to engage bell-cranks 31, that are pivoted on depending brackets 32, secured to the top of said base at each end of a slot or opening 33 therein. The brackets are provided beneath the slot 33 with vertical slots 34, wherein the ends of a yoke 35 are adapted to slide. The bell-cranks 31 are provided with adjustable screws 31', by means of which the stroke or travel of each end of the yoke may be regulated and engage the ends of the said yoke and elevate the same when said lever 27 is depressed against the tension of springs 31'', which insure the proper return of the yoke to its normal position. In the top of said yoke a socket is provided having a rectangular block 36, preferably of hard rubber, and adapted to be raised up through the slot 33 into contact with one of the dies when the mechanism is operated. This block has longitudinal grooves 36', adapted to receive flanges 36'', which hold the block in place, but permit it to be inserted into its socket or removed through the back of the case.

Depending from the top of the base on each side of the slot therein are brackets or hangers 37 and 38. The brackets 37 are provided with notches 39 and 40 to receive the shafts 41 and 42 of the inking-rolls 43 and 44. A threaded hole 45 is provided in the lower end of each bracket 37, communicating with the notches 40, and into this hole I insert recessed pins 46, which engage the ends of the shaft 42 and prevent them from accidentally slipping out of the notches 40. The engagement of the roll 44 with the upper roll holds the latter in position. In the holes 45 I insert threaded plugs 47, between which and said pins springs 48 are arranged, by means of which and said plugs the lower inking-roll may be adjusted with respect to the upper one. The opposite brackets 38 are provided with corresponding notches to receive the shafts 49 and 50 of hard-rubber rolls 51 and 52. The shafts of these rolls are held in their notches in the manner corresponding to the inking-rolls. Upon the shaft 50 I provide a ratchet 53, beneath which is a spring 54 to prevent backward movement of the ratchet and its roll, and upon the adjacent arm 30 I pivot a dog 55, that engages the teeth of the ratchet 53 and is normally held in contact therewith by a spring 56. Rocking of the shaft 26 and the consequent depression of the arms 30 will cause rotation of the roll 52, and through it the roll 51 in contact therewith. Between the inking-rolls and the rolls 51 and 52 I provide an endless inking-ribbon 57, that passes over the block 36 and has sufficient slack to allow it to be carried up through the slot 33 against the die by the upward movement of the yoke 35. The ribbon is normally held taut over the block 36 by springs 58. This ribbon is similar to the kind used on type-writers and serves to ink the under side of and thoroughly impregnate the impression or outline of the characters or figures made in the paper, thus increasing the difficulty of altering or raising the figures. The ribbon is kept supplied with ink by means of the rolls 43 and 44, and as the movement of the operating mechanism and the friction-rolls 51 and 52 serves to feed the ribbon fresh surfaces will be continually exposed to the block 36 and undue wear of any portion of the ribbon prevented.

The casing 12 is provided with slots 59 at the front and back and on the sides of the machine in order that a check or other instrument may be inserted between the dies and the vertically-moving block. If it is desired to make the figures or characters lengthwise or diagonally on the check or other paper, it is inserted at the front or back between the legs 3, and if it is desired to mark the check transversely it is put in at the side. The manner of marking the check will depend somewhat upon its shape and size, it being more convenient to insert those of a certain size at the front or back and others at the sides of the machine. To hold one end of the check down upon the base while a portion is being raised into contact with the die, I provide a wire 60, extending across the base, between which and the base the check is inserted. The opposite end will be held in position by the means hereinafter described.

I prefer to provide means for inking the die just prior to its engagement with the paper to be marked, said inking means being adapted to be operated by the movement of the mechanism which raises the check into contact with the die. With this end in view I provide oscillating arms 61 and 62 on the ends of the shaft 7, the latter arm being forked at its lower end, as shown, and connected with the opposite arm by a plate 63. Upon the plate 63 I arrange guides 64, between which a brush 65 is adapted to slide and yieldingly held in place by a flat spring 66, having a locking-rib 66' to enter a corresponding groove 66'' in the brush-back. The back of the brush has a hooked end 67 in position to be grasped by the finger to draw the brush out of its place between the forks of the arm 62. This removable feature of the brush permits it to be taken out for cleaning purposes or renewal. The arm 62 near is upper end is provided with a curved slot 68 to receive a pin 69 on an arm 70. This arm is crooked near its lower end to carry it out of the path of the oscillating brush-arm and is pivoted on one of the arms 30, so that movement of the shaft 26 will actuate the inking-arms and move the brush back and forth over the dies. The brush is shown in its normal position in Fig. 1 at the right of the slot in the base and of the die, into contact with which the paper is to be moved. Upon the depression of the operating-lever the pin 69, engaging the side of the slot and traveling therein, will swing the brush across the face of the die, thoroughly inking the same. After the brush has passed over to the left-hand side of the slot 33 the pin 69 will have reached a point near the middle of the slot 68, and from this point as the pin travels on to the end of the slot the brush will remain stationary and on the return of the lever will be carried back to its normal position. While the brush and its support are occupying a position at the left hand of the slot 33, the plate 66 will be sufficiently near the check to hold the end portion thereof down upon the base while the part over the slot 33 is being raised into engagement with the die.

To insure each die being in its proper position during the operation of marking the check, I provide a dog 71, pivoted on a lug 72, provided on one of the legs 3 and having a pivotal connection also with the arm 70. This dog is so adjusted that when the arm 70 is actuated by the movement of the operating-lever the dog cannot enter one of the notches 11 in the edge of the die-holder until the die is in its proper position over the ascending block. Movement of the holder during the marking operation will be prevented by said dog and by the arm 17.

In Figs. 13 and 14 I have shown a modified construction of the means for moving the paper into contact with the die. This construction consists in mounting a shaft 73 in the brackets 32 and providing said shaft with an operating-lever 74 and a spring 75, which normally holds said lever in a raised position. The shaft 73 is connected by links 75' and 76 with a shaft 77, that is vertically movable in slots in the brackets 32, corresponding to those heretofore described, and beneath an opening in the base on the shaft 77 is mounted a hard-surfaced roller 78, that is normally in contact with an inking-roller 79 on a shaft 80. A ratchet 81 is mounted on the shaft 77, and springs 82 and 83, secured on one of the brackets 32, engage the teeth of said ratchet and cause rotation of the roll 78 as it is raised and lowered. The spring 83 also engages the teeth of a ratchet 84, that is mounted on the shaft 80, and causes rotation of the inking-roll. A short arm 85 is pivoted on the shaft of the die-holder, and this arm is pivotally connected by a link 86 with the operating-lever 74. An arm 87 is also secured on said shaft and is provided at its lower end with a fork 88, having slots 89 wherein pins 90 on the arm 87 are slidable. To the lower end of the fork 88 the brush-holder plate 66 is secured, the brush and the plate being substantially the same as heretofore described. The casing of the machine near the end of said brush-plate is provided with a slot 91 wherein the end of the brush-holder plate is slidable, and this slot has an upward extension 92, through which access may be had to the brush for insertion or removal. By the operation of the lever 74 the inking-roll will be raised into engagement with the under side of the paper, causing the upper side of the same to be moved into contact with one of the dies and the figures or characters represented by that die marked in or on the paper. At the same time the outline of the figures or characters on the under side of the paper will be inked by the ascending roll. With each operation of the lever the inking-brush will be swept over the dies, freely inking the same before their engagement with the paper. I also provide a normally stationary inking-roll 23, past which the die-holder is rotated. Upon the shaft 77 I provide a curved sheet-metal guard 93, having a longitudinal slot 94, through which contact may be had between the surface of the roll and the under side of the paper and the dies. The guard 93 at the ends is provided with extensions or lugs 95, which project into the guides in the brackets 32 and prevent said guard from turning on the shaft. This guard will protect the under side of the paper from being smeared with ink by the roll at any other point except where the mark or impression is made.

I have shown and described an oscillating inking device adapted to sweep over the face of the die before it engages the paper to be marked; but I do not claim said inking device in this present application, except in combination with other devices and constructions, as the same is claimed, broadly, in my pending application for United States patent, filed January 28, 1901, Serial No. 45,011.

I claim as my invention—

1. The combination, with a die-holder, of a series of fixed dies, means for moving the paper to be marked into contact with a die, and means actuated by the force that moves said paper into contact with a die for locking said die-holder and automatically inking a die prior to the engagement of the paper therewith.

2. The combination, with a die-holder rotating in a vertical plane, of a series of fixed dies, means for moving the paper to be marked into contact with a die, a stationary inking device, a movable inking device adapted to automatically sweep across the face of a die after it is adjusted to receive the paper but prior to its engagement therewith, and means for inking the under side of the mark or character formed in or on the paper.

3. The combination, with a die-holder rotating in a vertical plane, of a series of fixed dies each representing a certain sum and the words "Not over," means for moving the paper to be marked into contact with a die, a stationary inking-roller, a swinging inking-brush actuated by the force that moves the paper toward the dies for inking a die prior to its engagement with the paper, and means for inking the under side of the mark or character formed in or on the paper.

4. The combination, with a rotating cylindrical die-holder and a series of fixed dies thereon, of a slotted base beneath said holder, a reciprocating block operating through the slot in said base to engage the under side of the paper and move it into contact with a die, a stationary inking-roll, and means for holding the ends of the paper upon said base while the intermediate portion thereof is moved into contact with a die by the action of said block.

5. The combination, with a cylindrical die-holder and a series of fixed dies thereon, of a slotted base provided beneath said holder, a reciprocating block operating through the slot in said base and adapted to engage the under side of a check or draft and move it into contact with a die, an oscillating inking device adapted to engage a die after its adjustment to receive the paper but before its contact therewith, and means for inking the under side of the mark or character formed in or on the paper by the die.

6. The combination, with a rotating cylindrical die-holder and a series of fixed dies thereon, of a base whereon said holder is supported, a reciprocating block operating through a slot in said base, a rock-shaft, an operating-lever thereon, operative connections provided between said shaft and said block, an oscillating inking device adapted to sweep over the face of a die that stands in the path of said block, and suitable means connecting said shaft and said inking device.

7. The combination, with a rotating cylindrical die-holder and its shaft, of a series of fixed dies provided on the periphery of said holder, oscillating arms mounted on said shaft, a brush-guide carried by said arms, and a yieldingly-held brush provided in said guide and adapted when said arms are oscillated to sweep across the face of a die.

8. The combination, with a rotating cylindrical die-holder and a series of dies fixed thereon, of an inking-roll adapted to engage said dies, hooks having loops to receive the ends of said roll-spindle, springs normally closing the open ends of said loops, a casing inclosing said holder and provided with an opening through which access may be had to said roll.

9. The combination, with a rotating cylindrical die-holder and its shaft, of a series of dies provided on the periphery of said holder, a rock-shaft, an operating-lever thereon, arms secured on said shaft, a reciprocating block, operative means provided between said rock-shaft arms and said block, whereby when said lever is operated said block will engage the back side of the paper and move it into contact with a die, an oscillating inking device carried by said die-holder shaft, and means connecting said rock-shaft with said inking device, whereby when said lever is operated said inking device will be moved across the face of the die to ink the same before the engagement of the paper therewith.

10. The combination, with a rotating cylindrical die-holder and its shaft, of a series of dies provided on the periphery of said holder, oscillating arms mounted on said die-holder shaft, an inking-brush carried by said arms, a rock-shaft, an operating-lever thereon, and a link connected with said rock-shaft and having a sliding connection with one of said oscillating arms, whereby when said lever is operated said brush will be moved across the face of a die.

11. The combination, with a die-holder and a series of fixed dies thereon representing certain characters or figures and having roughened faces that bruise but do not perforate the paper, of means for causing contact between said dies and the paper to be printed or marked, and means actuated by the force that causes contact between the die and the paper for inking the face of a die prior to the contact of the paper therewith.

12. A check-protector, comprising a die-holder and series of dies adapted to impress figures or characters on the surface of the paper to be marked, in combination, with means for bending the paper transversely and raising it up into contact with a die, means for inking the convex under side of the depressions made in the surface of the paper by the pressure of a die.

13. The combination, with a rotating die-holder and a series of dies thereon, of a reciprocating platen, an endless ribbon adapted to cross the face of said block, inking-rolls between which said ribbon passes, friction feed-rolls for said ribbon, and spring devices for drawing said ribbon taut over said platen.

14. A check-protector, comprising a die-holder rotating in a vertical plane, a series of dies thereon adapted to impress figures or characters on the surface of the paper to be marked, means for bending the paper transversely and raising its middle portion into contact with a die and means for inking on the under or reverse side of the paper the convex surface of the impression of the character or characters made in said paper.

15. In a device of the class described, the combination, with a rotating die-holder provided with a series of dies, of rock-shaft and the operating-lever, arms provided on said shaft, a reciprocating yoke, a block or hammer carried thereby, bell-cranks adapted to engage said yoke and actuated by the movement of the rock-shaft arms, and means provided on said bell-cranks whereby the movement of said yoke may be regulated.

16. The combination, with a check-protector base, of a rotating die-holder provided with a series of dies, brackets depending from said base and provided with notches 39 and 40, one above the other, of rolls having their shafts fitting within said notches, and adjustable spring devices provided in said brackets beneath the shaft of the lower roll for holding said lower roll in yielding contact with the upper roll.

17. A check-protector, comprising a die-holder rotating in a vertical plane and a series of dies secured at intervals on the periphery thereof, in combination, with a paper-support having an opening, means operating through said opening for moving the paper to be marked into contact with a die, means for inking the under side of the paper under the mark or impression made therein by a die without inking the paper around said impression, and means provided between said holder and said paper-support and actuated by the force that moves the paper toward a die for inking the die prior to contact of the paper therewith.

18. The combination, with a die-holder, rotating in a vertical plane and provided with a series of dies on its periphery adapted to print or impress the figures or characters they represent on the surface of the paper to be marked without perforating the same, of means for moving the paper to be marked to bring its face into contact with a die, an inking device suspended between said holder and said paper-moving means and actuated by the force that moves the paper toward a die to ink the die prior to the engagement of the paper therewith, means for bending the paper transversely and raising its middle portion against a die to make an impression on the face of the paper, and means for inking the convex under side of said impression.

19. The combination, with a die-holder rotating in a vertical plane, of a series of dies provided on the periphery of said holder, a paper-support, means for moving the paper to be marked into contact with a die, an oscillating inking device suspended substantially parallel with the dies between said holder and said paper-support, a mechanism connecting said paper-moving means and said inking device, whereby the force that actuates the former during the first part of its stroke will cause said inking device to sweep across the face of a die, and means provided between said paper-moving means and the paper for inking the reverse side of the mark or character formed in the paper.

20. A check-protector, comprising a die-holder having a slotted base, and a series of dies thereon adapted to print or impress figures or characters on the surface of the paper, in combination, with a reciprocating platen operating through the slot in said base and having a comparatively hard face adapted to engage the back of the paper and move it into contact with a die, and an inking device actuated by the force that moves said platen toward the die and interposed between said platen and paper and adapted to ink the reverse side of the mark or character made in the surface of the paper by the die.

21. A check-protector, comprising a die-holder rotating in a vertical plane and provided with a series of fixed dies, in combination, with a vertically-movable platen adapted to engage the back side of the paper and bend it transversely and move it into contact with a die, a suitable paper-support, means for holding the ends of the paper thereon while the middle portion is being raised, an operating-lever having operative connections with said platen for actuating the same, and an inking-ribbon adapted to travel across the face of said platen and ink the back side of the mark or character made in the paper by the die.

22. In a check-protector, the combination, with a die-holder rotating in a vertical plane, of a series of dies fixed on the periphery of said holder, an inking device, oscillating arms extending from a point near the center of said holder beyond its circumference and whereto the ends of said inking device are secured outside the periphery of said holder, and means for oscillating said arms to sweep said inking device across the face of a die.

23. A check-protector, comprising a die-holder rotating in a vertical plane and provided on its periphery with a series of dies, a vertically-movable platen adapted to engage the back side of a check or draft and bend it and raise its face into engagement with a die, means for holding the ends of the paper while its folded portion is being moved into contact with the die, an operating-lever, a mechanism connecting said lever and platen, and means actuated by the movement of said platen for inking the convex under side of the mark or character made in or on the surface of the paper.

24. In a check-protector, the combination, of a die-holder rotating in a vertical plane and provided on its periphery with a series of dies, with a reciprocating platen adapted to engage the under side of the paper and move it into engagement with a die, an operating-lever, a mechanism connecting said lever and platen whereby the latter will be operated when said lever is moved, means actuated by the movement of said platen for inking the under side of the mark or character made on the surface of the paper by a die, and an oscillating inking device provided between said holder and platen and actuated by the movement of said lever to sweep across the face of a die and ink the same prior to the engagement of the paper therewith.

In witness whereof I have hereunto set my hand this 4th day of December, 1901.

GAYLORD W. BEEBE.

In presence of—
RICHARD PAUL,
M. C. NOONAN.